US012561701B2

(12) United States Patent
Blanuşa et al.

(10) Patent No.: US 12,561,701 B2
(45) Date of Patent: Feb. 24, 2026

(54) PROCESSING GRAPHS USING GRAPH PATTERNS

(71) Applicant: International Business Machines Corporation, Armonk, NY (US)

(72) Inventors: Jovan Blanuşa, Zurich (CH); Maximo Cravero Baraja, San Marino, CA (US); Kubilay Atasu, Rueschlikon (CH); Charalampos Pozidis, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 18/194,701

(22) Filed: Apr. 3, 2023

(65) Prior Publication Data

US 2024/0330959 A1     Oct. 3, 2024

(51) Int. Cl.
*G06Q 40/00*     (2023.01)
*G06Q 30/018*     (2023.01)

(52) U.S. Cl.
CPC ......... *G06Q 30/0185* (2013.01); *G06Q 40/00* (2013.01)

(58) Field of Classification Search
CPC ..... G06Q 30/01; G06Q 30/0185; G06Q 40/00
USPC ................................................ 705/4, 35–45
See application file for complete search history.

(56) References Cited

U.S. PATENT DOCUMENTS

| | | | | |
|---|---|---|---|---|
| 10,970,292 | B1 * | 4/2021 | White | G06F 16/24578 |
| 2018/0075038 | A1 * | 3/2018 | Azvine | G06F 16/22 |
| 2019/0236464 | A1 * | 8/2019 | Feinson | G06F 40/20 |
| 2020/0401908 | A1 * | 12/2020 | Ortega | G06N 20/00 |
| 2021/0232918 | A1 | 7/2021 | Cheng | |
| 2021/0342352 | A1 * | 11/2021 | Stuart | G06F 16/9024 |
| 2021/0342397 | A1 * | 11/2021 | Oberhofer | G06F 16/367 |

(Continued)

FOREIGN PATENT DOCUMENTS

| | | |
|---|---|---|
| CN | 111476662 A | 7/2020 |

OTHER PUBLICATIONS

Addanki, et al., "Large-Scale Graph Representation Learning With Very Deep GNNS and Self-Supervision", https://arxiv.org/abs/2107. 09422, Cornell University, Computer Science, Machine Learning, Jul. 20, 2021, pp. 1-14.

(Continued)

*Primary Examiner* — Mike Anderson
*Assistant Examiner* — Mohammed H Mustafa
(74) *Attorney, Agent, or Firm* — Edward J. Wixted, III

(57)     ABSTRACT

In an approach, a processor identifies subgraphs of predefined patterns in a first graph, the first graph: (i) representing a specific ontology and (ii) comprising nodes representing first entities and first edges representing relationships between the first entities. A processor represents the identified subgraphs by respective second graphs, thereby forming multi-relational graphs, each second graph comprising nodes representing second entities and second edges representing relationships between the second entities, where: the second entities are the respective nodes of the first graph; and each second edge indicates that the two second entities linked by the second edge are part of a pattern of the predefined patterns. A processor inputs the multi-relational graphs to a multi-relational graph neural network for generating output in accordance with the specific ontology. A processor provides the output.

20 Claims, 7 Drawing Sheets

(56) References Cited

U.S. PATENT DOCUMENTS

2022/0027707 A1   1/2022  Wu
2022/0138502 A1   5/2022  Li

OTHER PUBLICATIONS

Altman, "IBM Transactions for Anti Money Laundering (AML)", Kaggle, https://www.kaggle.com/datasets/ealtman2019/ibm-transactions-for-anti-money-laundering-aml, Accessed Mar. 29, 2023, pp. 1-11.

Barabasi, "Network science", The Royal Society Publishing, Philosophical Transactions of the Royal Society A mathematical, Physical and Engineering Sciences, https://royalsocietypublishing.org/doi/epdf/10.1098/rsta.2012.0375, Chapter 4, Mar. 28, 2013, pp. 1-67.

Bevilacqua, et. al., "Equivariant Subgraph Aggregation Networks", https://arxiv.org/abs/2110.02910, Published as a conference paper at ICLR 2022, Computer Science, Machine Learning, V3, Mar. 16, 2022, pp. 1-47.

Blanusa, et. al., "Manycore Clique Enumeration with Fast Set Intersections", https://research.ibm.com/publications/many-core-clique-enumeration-with-fast-set-intersections, IBM, VLDB 2020 Conference paper, Accessed Mar. 24, 2023, pp. 1-4.

Bouritsas, et. al., "Improving Graph Neural Network Expressivity via Subgraph Isomorphism Counting", https://arxiv.org/abs/2006.09252, Computer Science, Machine Learning, V3, Jul. 5, 2021, pp. 1-30.

Garg, et. al., "Generalization and Representational Limits of Graph Neural Networks", https://arxiv.org/abs/2002.06157, Cornell University, Computer Science, Machine Learning, Feb. 14, 2020, pp. 1-23.

Hajdu, et. al., "Temporal Network Analytics for Fraud Detection in the Banking Sector", https://www.researchgate.net/publication/343701757_Temporal_Network_Analytics_for_Fraud_Detection_in_the_Banking_Sector, Springer Nature Switzerland AG 2020, ResearchGate, Aug. 2020, pp. 14 (p. 145-157).

Islam, et. al., "An Approach to Improve Collusion Set Detection Using MCL Algorithm", https://ieeexplore.ieee.org/document/5407133, Proceedings of 2009 12th International Conference on Computer and Information Technology (ICCIT 2009), Dec. 21-23, 2009, pp. 237-242.

Jiang, et. al., "Trading networks, abnormal motifs and stock manipulation", https://www.tandfonline.com/doi/full/10.1080/21649502.2013.802877, Taylor & Francis, Quantitative Finance Letters, vol. 1, Jun. 21, 2013, pp. 1-9.

Kanezashi, "Transaction Model: Alert Model", https://github.com/IBM/AMLSim/wiki/Transaction-Model:-Alert-Model, IBM/AMLSim, Edited page on Oct. 13, 2021, 14 revisions, Accessed Mar. 27, 2023, pp. 1-9.

Leskovec, "Machine Learning with Graphs", Stanford University, http://cs224w.stanford.edu, Dec. 6, 2018, pp. 1-66.

Liu, et. al., "Knowledge Discovery in Cryptocurrency Transaction: A Survey", https://ieeexplore.ieee.org/document/9364978, IEEE, vol. 9, Mar. 10, 2021, pp. 37229-37254.

Nicholls, et. al., "Financial Cybercrime: A Comprehensive Survey of Deep Learning Approaches to Tackle the Evolving Financial Crime Landscape", https://ieeexplore.ieee.org/document/9642993, vol. 9, 2021, Dec. 20, 2021, p. 163965-163986.

Oono, et. al., "Graph Neural Networks Exponentially Lose Expressive Power For Node Classification", https://arxiv.org/abs/1905.10947, Published as a conference paper at ICLR 2020, Cornell University, Computer Science, Machine Learning, v5, revised Jan. 6, 2021, pp. 1-38.

Palshikar, et. al., "Collusion set detection using graph clustering", https://link.springer.com/article/10.1007/s10618-007-0076-8, Springer, Data Min Knowl Disc (2008) 16, Published online Jun. 16, 2007, pp. 135-164.

Qiu, et. al., "Real-time Constrained Cycle Detection in Large Dynamic Graphs", https://dl.acm.org/doi/10.14778/3229863.3229874, ACM, Proceedings of the VLDB Endowment, vol. 11, No. 12, Aug. 2018, pp. 1876-1888.

Schlichtkrull, et. al., "Modeling Relational Data with Graph Convolutional Networks", https://arxiv.org/abs/1703.06103, Statistics, Machine Learning, V4, Oct. 26, 2017, pp. 1-10.

Tahmasebi, et. al., "Counting Substructures with Higher-Order Graph Neural Networks: Possibility and Impossibility Results", https://arxiv.org/abs/2012.03174, Cornell University, Computer Science, Machine Learning, V2, Oct. 11, 2021, pp. 1-27.

Xu, et. al., "How Powerful Are Graph Neural Networks?", https://arxiv.org/abs/1810.00826, Published as a conference paper at ICLR 2019, Cornell University, Computer Science, Machine Learning, V3, Feb. 22, 2019, Pages.

Ying, et. al., "Neural Subgraph Matching", https://arxiv.org/abs/2007.03092, Computer Science, Machine Learning, V2, Oct. 27, 2020, pp. 1-17.

Zhao, et. al., "From Stars to Subgraphs: Uplifting Any GNN With Local Structure Awareness", https://arxiv.org/abs/2110.03753, Published as a conference paper at ICLR 2022, Computer Science, Machine Learning, V3, Apr. 20, 2022, pp. 1-23.

* cited by examiner

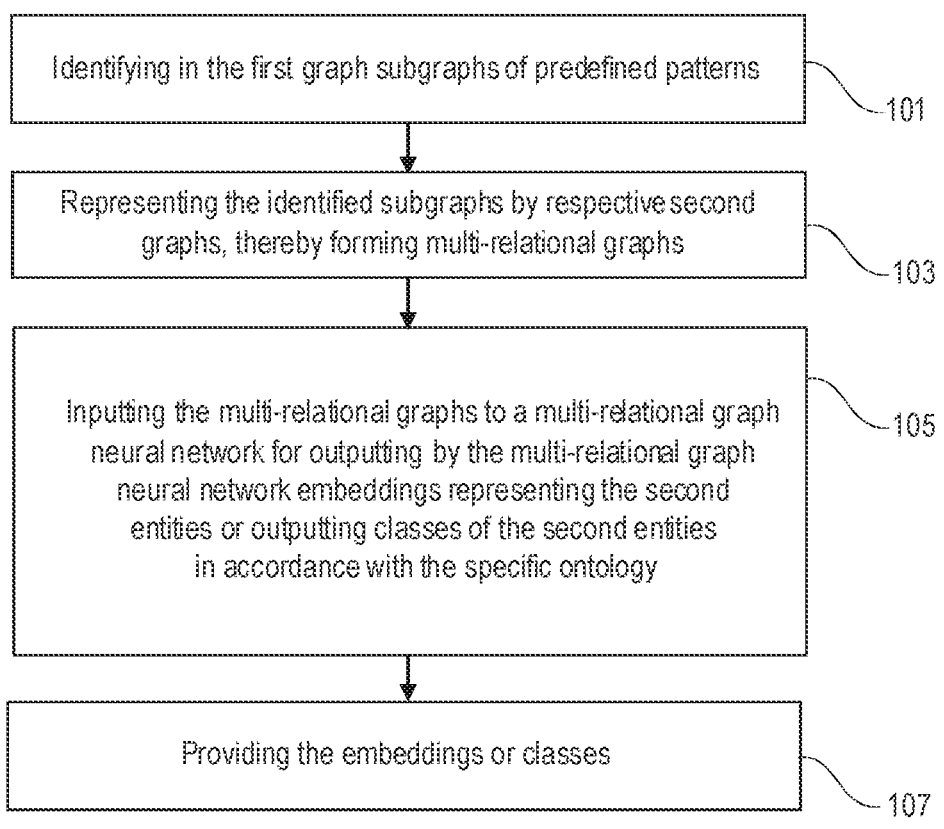

Identifying in the first graph subgraphs of predefined patterns ⎯101

Representing the identified subgraphs by respective second graphs, thereby forming multi-relational graphs ⎯103

Inputting the multi-relational graphs to a multi-relational graph neural network for outputting by the multi-relational graph neural network embeddings representing the second entities or outputting classes of the second entities in accordance with the specific ontology ⎯105

Providing the embeddings or classes ⎯107

Fig. 1

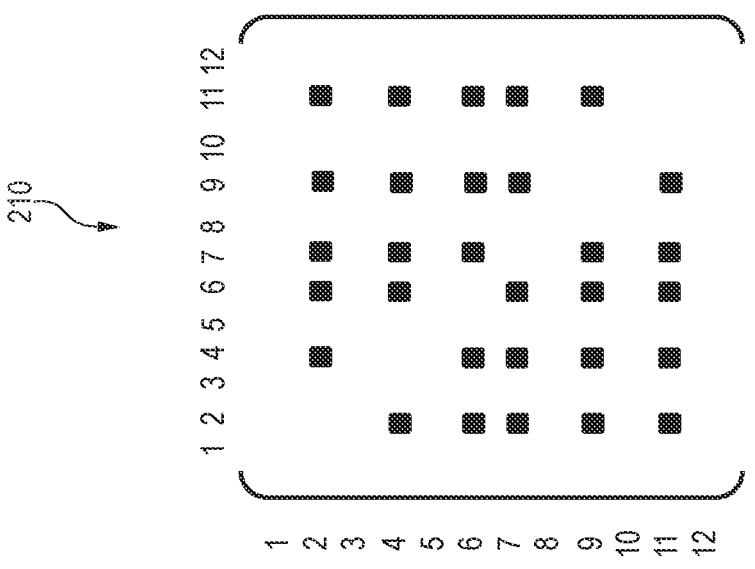
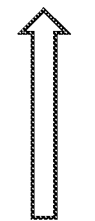
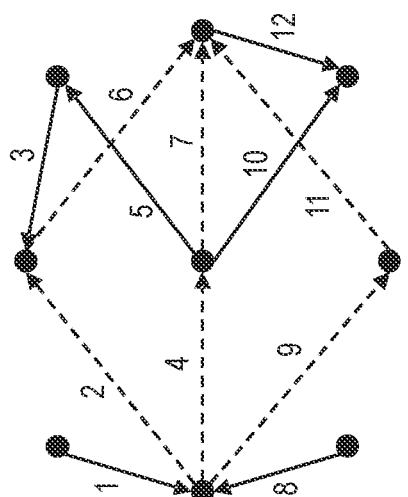
Fig. 2A

PROCESSING GRAPHS USING GRAPH PATTERNS

BACKGROUND

The present invention relates to digital computer systems, and more specifically, to an approach for processing a graph.

Graphs offer a natural representation for structured and unstructured data in many application domains. For example, the World Wide Web, social networks, financial transactions, and customer buying behaviors are best modelled using graphs. Graphs enable efficient analysis of large and complex datasets by exposing the connectivity of the underlying data objects. Classification of graph objects and discovery of nontrivial new relationships between graph objects in a scalable manner is a key capability of modern data analytics platforms.

SUMMARY

According to an embodiment of the present invention, a computer-implemented method, computer program product, and computer system are provided. A processor identifies subgraphs of predefined patterns in a first graph, the first graph: (i) representing a specific ontology and (ii) comprising nodes representing first entities and first edges representing relationships between the first entities. A processor represents the identified subgraphs by respective second graphs, thereby forming multi-relational graphs, each second graph comprising nodes representing second entities and second edges representing relationships between the second entities, where: the second entities are the respective nodes of the first graph; and each second edge indicates that the two second entities linked by the second edge are part of a pattern of the predefined patterns. A processor inputs the multi-relational graphs to a multi-relational graph neural network for generating output in accordance with the specific ontology. A processor provides the output.

BRIEF DESCRIPTION OF THE DRAWINGS

In the following embodiments of the invention are explained in greater detail, by way of example only, making reference to the drawings in which:

FIG. 1 is a flowchart of an approach for processing a graph in accordance with an example of the present subject matter.

FIG. 2A is a block diagram illustrating an approach for creation of a graph in accordance with an example of the present subject matter.

DETAILED DESCRIPTION

Figure 2B:
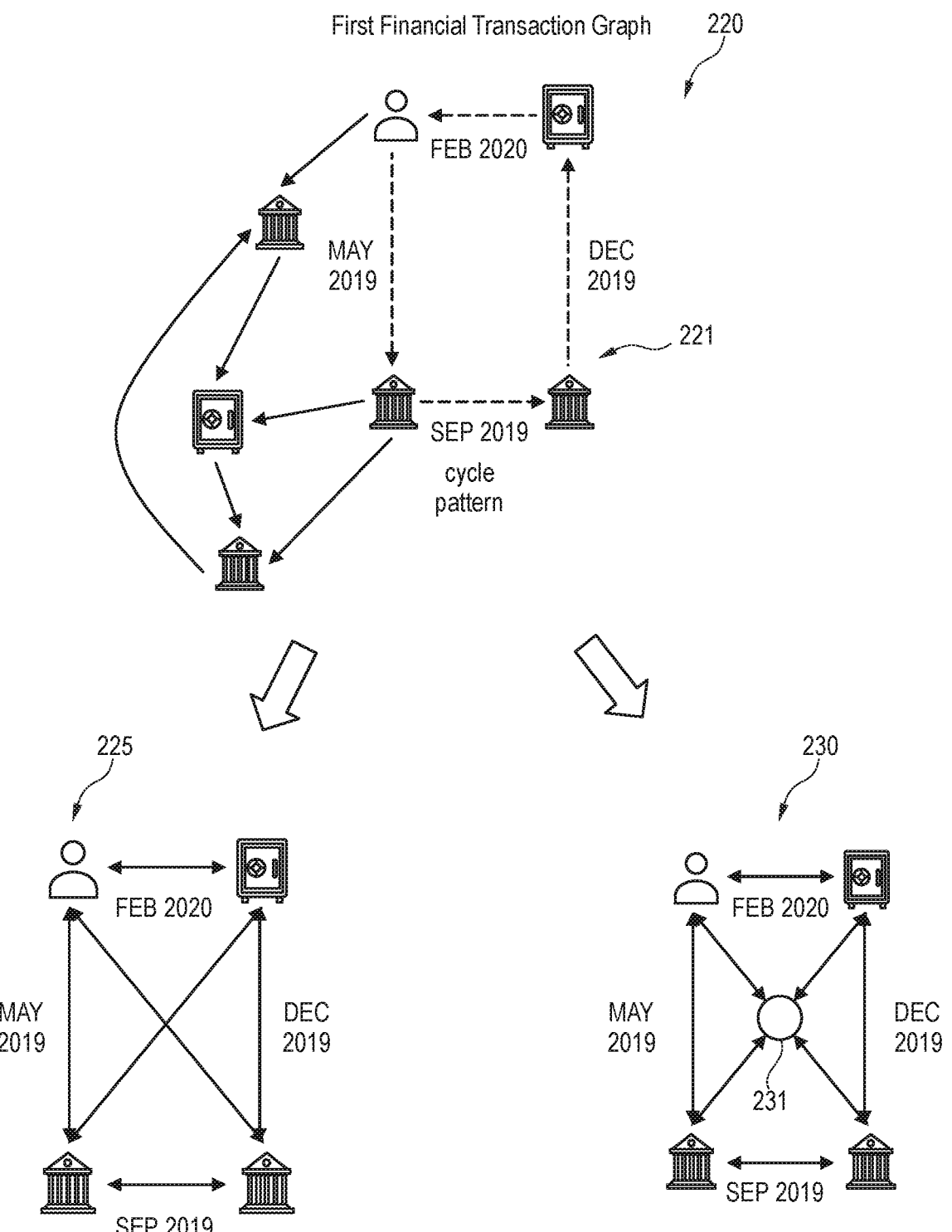
FIG. 2B is a block diagram illustrating an approach for creation of a graph in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments of the present invention recognize that there is a need for efficient mechanisms to manage, integrate, and analyze ever larger graphs.

The term "graph" as used herein may refer to a property graph where data values are stored as properties on nodes and edges. Property graphs may be managed and processed by a graph database management system. The graph may, for example, be a directed graph. The graph may be a collection of nodes (also called as vertices) and edges. The edge of the graph may connect any two nodes of the graph. The edge may be represented by an ordered pair $(v1, v2)$ of nodes and that can be traversed from node $v1$ toward node $v2$. A node of the graph may represent an entity. The entity may refer to a company, user etc. The entity (and the corresponding node) may have one or more entity attributes or properties which may be assigned values. For example, the entity attributes of the user may comprise a user ID, location of the user, etc. The attribute values that represent the node are values of the entity attributes of the entity represented by the node. The edge may be assigned one or more edge attribute values indicative of at least a relationship between the two nodes connected to the edge. The attribute values that represent the edge are values of the edge attributes. The relationship may, for example, comprise an inheritance (e.g., parent and child) relationship and/or associative relationship in accordance with a certain hierarchy. For example, the inheritance relationship between nodes $v1$ and $v2$ may be referred to as a "is-a relationship" between $v1$ and $v2$ e.g., "$v2$ is-a parent of $v1$" or "$v2$ made a transaction to account $v1$." The associative relationship between nodes $v1$ and $v2$ may be referred to as a "has-a relationship" between $v1$ and $v2$, e.g., "$v2$ has a has-a relationship with $v1$," means that $v1$ is part or is a composition of or associated with $v2$. In financial transaction graphs, the relationships can also be defined based on money transfers between different accounts.

The nodes and relationships may provide low-level building blocks. However, they may encode information which may not be enough for an improved processing of the graphs. For that, embodiments of the present subject matter may further make use of patterns in the graph. Indeed, the graph may encode patterns of connected nodes and relationships based on the ontology being represented by the graph. In contrast to individual nodes and relationships, a pattern of nodes and relationships may encode arbitrarily complex concepts and support a variety of features which may be useful for classification or encoding.

Embodiments of the present subject matter may enable an efficient processing of the first graph. The first graph may represent the specific ontology. The ontology (or domain-specific ontology) represents concepts which belong to a realm of the world, such as biology, finance or politics. Depending on the ontology represented by the first graph, there may be different types of relations in the graph, wherein each relation type may be represented by one or more subgraphs of the graph. For example, a graph representing families may represent different types of families such as nuclear families; single-parent families; extended families; childless families, etc. Each relation type may be defined by a pattern or subgraph pattern. Thus, depending on the ontology of the first graph, different sets of patterns may be defined. Embodiments of the present subject matter may make use of the patterns in order to improve the processing of the graphs. Embodiments of the present subject matter may transform a homogenous graph into heterogenous graphs each associated with a pattern.

Embodiments of the present subject matter may thus fully use the information available in the subgraphs in order to perform classification or generate embeddings. The locality in the graph structure, e.g., such as the fact that two vertices participate in exactly the same pattern, may be exploited. The proximity between two vertices that are part of the same pattern and the proximity between two vertices that are part of different patterns may not be the same based on the present encoding. Embodiments of the present approach may involve a transformation of a given graph into a multi-relational representation that can embed different subgraph patterns in the form of different types of relationships between vertices.

The multi-relational graph neural network may be a trained graph neural network for classifying input entities of multi-relational graphs into two or more classes. Embodiments of the present subject matter may thus enable an accurate classification depending on the ontology being used. Alternatively, the multi-relational graph neural network may be a trained network for generating embeddings for input entities and input edges of multi-relational graphs in a predefined embedding space. The embedding may advantageously be used to enhance the data, e.g., the data of the initial graph may be augmented with the embeddings. This augmented data may further be used for different purposes such as data mining. In one example, the multi-relational graph neural network may be a Relational Graph Convolutional Network (RGCN).

The multi-relational graph neural network may take a set of vectors representing nodes as input, together with the structure of the graph and generate a new collection of representations for nodes in the graph. More than a single layer may be used to capture the complexity of large graphs. The layers may be stacked one after another so that the output of the preceding layer $l-1$ is used as the input for the current layer $l$. The multi-relational graph neural network may account for the directions of the edges and handling message passing for different relations separately. The message passing rule defines how the information should be mixed together with neighboring nodes in the second graphs. In the message passing step, the embedding is aggregated over the different relations according to the following propagation model for calculating the forward-pass update of an entity or node denoted by $v_i$ in the multi-relational graph:

$$h_i^{(l+1)} = \sigma\left(\sum_{r\in\mathcal{R}}\sum_{j\in\mathcal{N}_i^r}\frac{1}{c_{i,r}}W_r^{(l)}h_j^{(l)} - W_0^{(l)}h_i^{(l)}\right),$$

where $\mathcal{N}_i^r$ denotes the set of neighbor indices of node $i$ under relation $r\in\mathcal{R}$, $r\in\mathcal{R}$ is a relation type, $h_i^{(l)}$ is the embedding of node $v_i$ in the l-th layer of the neural network, $\sigma(.)$ is an activation function, $W_r^{(l)}$ is a relation-specific weight matrix under relation $r\in\mathcal{R}$ in the l-th layer of the neural network, $W_0^{(l)}$ is an initialization weight matrix in the l-th layer of the neural network. $c_{i,r}$ is a problem-specific normalization constant that can either be learned or chosen in advance (e.g., $c_{i,r}=|\mathcal{N}_i^r|$). Embodiments of the present subject matter may provide the embeddings of the last layer $l$ of the multi-relational graph neural network or use these embeddings for performing entity classification.

The multi-relational graph neural network may be trained to provide the embeddings or perform the classification as follows. The training may be performed using training data comprising multi-relational graphs with labeled nodes. For a (semi-)supervised classification of the nodes, the layers may be stacked as defined in the equation above. In addition, a softmax activation may be applied per node on the output of the last layer. During the training, the following cross-entropy loss may be minimized on all labeled nodes (while ignoring unlabeled nodes): $\sum_{i\in\mathcal{Y}}\sum_{k=1}^K t_{ik}\ln h_{ik}^{(L)}$, where $\mathcal{Y}$ is the set of node indices that have labels and $h_{ik}^{(L)}$ is the k-th entry in the network output for the i-th labeled node, where K may be the total number of labels or classes. $t_{ik}$ denotes its respective ground truth label. The model may be trained using (full-batch) gradient descent techniques. The training may result in optimal values for the weight matrices $W_r^{(l)}$ and $W_0^{(l)}$ which may be used during the inference of the multi-relational graph neural network using the equation of the propagation model described above.

According to one example, the multi-relational graphs may comprise, in addition to the second graphs, one additional graph. This additional graph may be the first graph or a line graph representing the first graph. The additional graph may be chosen based on the type of second entities in the second graphs. For example, the additional graph may be the first graph if the second entities used in the second graph are representing the first entities of the first graph respectively. Alternatively, the additional graph may be the line graph of the first graph if the second entities used in the second graph are representing the first edges of the first graph respectively. This augmented multi-relational graphs may be used as input for the multi-relational graph neural network. The first graph may be an undirected graph. The line graph of the first graph is another graph L that represents the adjacencies between edges of the first graph. The line graph L may be constructed in the following way: for each edge in the first graph, a vertex may be created in the line graph L, and for every two edges in the first graph that have a vertex in common, an edge between their corresponding vertices may be created in the line graph L.

According to one example, creating the second graph comprises adding to the second graph a node that represents the pattern associated with the subgraph and linking the second entities that belong to the pattern with the created entity. Indeed, a new entity representing the pattern can be added to the second graph, and the entities of the second graph that are part of the pattern in the first graph are linked to the pattern entity in the second graph. According to one example, creating the second graph comprises: creating a matrix whose columns represent the first edges, respectively, and whose rows represent the first edges, respectively, wherein each cell of the matrix is set to a predefined value (e.g., "1") if the first edges associated with the cell belong to the pattern of the subgraph represented by the second graph; wherein the input of the multi-relational graph neural network comprises the created matrices. The matrix may be an adjacency matrix. The cells on the diagonal of the matrix may not be set to any value as they represent pairs of same edges. The cell of the matrix which is associated with two edges which are not both of them present in the pattern may not be set to any value. This may enable a simplified and seamless integration of embodiments of the present subject matter using existing multi-relational networks.

According to one example, the approach further comprises: creating a table having a record per second entity of the second graph. The table comprises fields representing the predicted embedding and one or more attributes descriptive of the second entities. The table records may be provided as input to a Light Gradient Boosting Model for classification of the second entities into classes of the specific ontology. This may be advantageous as it may make use of advanced classification tools and exploit the locality in the graph structure provided by the embeddings.

According to one example, the patterns are defined according to rules of the specific ontology. For example, a pattern mining using ontology-based semantic may explore possible patterns in the first graph and/or other graphs of the same ontology in order to identify the predefined patterns. The ontology may, for example, be a legal ontology. For example, subgraph patterns may be obtained based on an ontology that represents the knowledge inherent to money laundering crimes. The patterns that lead to money laundering schema may be identified. Alternatively, patterns such as cliques and cycles, in a graph may, for example, be detected using known approaches.

According to one example, the first entities are bank accounts and first edges are transactions between accounts, wherein the patterns are money-laundering patterns.

According to one example, the classes comprising a suspicious account class and a non-suspicious account class. These examples may enable to secure transactions in a banking system.

According to one example, the patterns comprise: fan-out pattern, bipartite pattern, cycle pattern, gather-scatter pattern, fan-in pattern, stacked bipartite pattern and scatter-gather pattern.

According to one example, the method further comprises creating a table having a record per second entity of the second graph, the table comprising fields representing the predicted embedding and one or more attributes descriptive of the second entities and storing the table. This may enable to enhance the content of existing data. This may, for example, be used for performing data analysis or mining on an enhanced content.

According to one example, for each pattern, multiple subgraphs are identified in the first graph, wherein for each pattern the second graph represents the multiple subgraphs representing the pattern.

FIG. 1 is a flowchart of an approach for processing a first graph in accordance with an example of the present subject matter. The first graph comprises nodes representing first entities and first edges representing relationships between the first entities, the first graph representing a specific ontology.

A processor identifies subgraphs of predefined patterns in step 101 in the first graph. A processor represents the identified subgraphs in step 103 by second graphs. respectively. The second graphs may be referred to as multi-relational graphs, respectively. The second graph comprises nodes representing second entities and second edges representing relationships between the second entities according to the pattern of the subgraph represented by the second graph. A processor inputs the multi-relational graphs in step 105 to a multi-relational graph neural network for outputting embeddings representing the second entities or outputting classes of the second entities in accordance with the specific ontology. A processor provides the embeddings or classes in step 107.

FIG. 2A depicts a diagram illustrating an approach for creating a second graph from a subgraph representing a given pattern according to an example of the present subject matter. The approach of FIG. 2A may be used as an example implementation of step 103.

A first graph 200 is provided. The first graph 200 comprises nodes representing first entities. In this example, the first graph 200 comprises 9 nodes. The first graph 200 comprise 12 first edges numbered from 1 to 12. The first graph 200 comprises one subgraph pattern as indicated by the dashed lines. The subgraph pattern comprises first edges 2, 4, 6, 7, 9 and 11.

FIG. 2A further shows a matrix 210 that represents a second graph that is created for representing the subgraph pattern. The second graph comprises nodes representing second entities, wherein the second entities are the 12 edges of the first graph 200. Each edge of the second graph links only nodes which belong to the subgraph pattern. This is indicated in the matrix 210. The matrix 210 comprises 12 columns representing the 12 second entities (i.e., the 12 first edges) respectively and comprises 12 columns representing the 12 second entities respectively. FIG. 2A shows only one matrix/graph 210 for simplification purpose, but other matrices may be generated for the first graph 200 each representing a distinct pattern in the first graph. These matrices may have the same size, same column and row representation of matrix 210, but each matrix may have different filling/cell values depending on the pattern.

The edges of the second graph are indicated as filled cells in the matrix 210. Each cell of the matrix 210 is set to a predefined value if the first edges associated with the cell belong to the subgraph pattern. For example, the cell (1, 1) does not represent an edge as it refers to the same edge 1 and thus it is not set to any value. The cell (1, 2) represents the first edges 1 and 2 respectively; however, as the two edges do not belong together to the pattern, that cell (1, 2) was not set. The cell (2, 4) represents the first edges 2 and 4 respectively, and since the two edges 2 and 4 both belong to the pattern, that cell (2, 4) was set to a value and so on. Hence, with the method of FIG. 2A, the second entities of the created second graph (matrix 210) may be the first edges of the first graph 200. Alternatively, the second entities of the created second graph may be the first entities of the graph from which they are created as indicated by FIGS. 2B-C.

FIG. 2B depicts a diagram illustrating an approach for creating a second graph from a subgraph representing a given pattern according to an example of the present subject matter. The approach of FIG. 2B may be used as an example implementation of step 103.

A first graph 220 is provided. The first graph 220 comprises nodes representing first entities which are financial related entities such as banks and accounts and the first edges represent the transactions. In this example, the first graph 220 comprises 7 nodes. The first graph 220 comprise 10 first edges. The first graph 220 comprises one subgraph pattern 221 (cycle pattern) as indicated by the dashed lines. The subgraph pattern 221 comprises four first entities and four first edges linking the first entities. The subgraph pattern 221 may be represented by two different second graphs. FIG. 2B shows these two second graphs 225 and 230. For simplification of the drawings, only the second entities which are associated with second edges are shown in second graphs 225 and 230.

The second graph 225 may be created such that the second entities of the second graph 225 are the 7 first entities of the first graph 220 respectively. In addition, the second graph

225 comprises second edges such that the two second entities connected to each second edge belong to the pattern 221 of the first graph 220.

The alternative second graph 230 may be created such that the second entities of the second graph 230 are the 7 first entities of the first graph 220 respectively. An additional second entity 231 may be added to the second graph 230. This second entity 231 may represent the whole pattern 221. Thus, the second graph 230 comprises 8 second entities. The second graph 225 comprises second edges such that each second entity connected to each second edge belongs to the pattern 221 or it is the additional second entity 231.

Figure 3A:
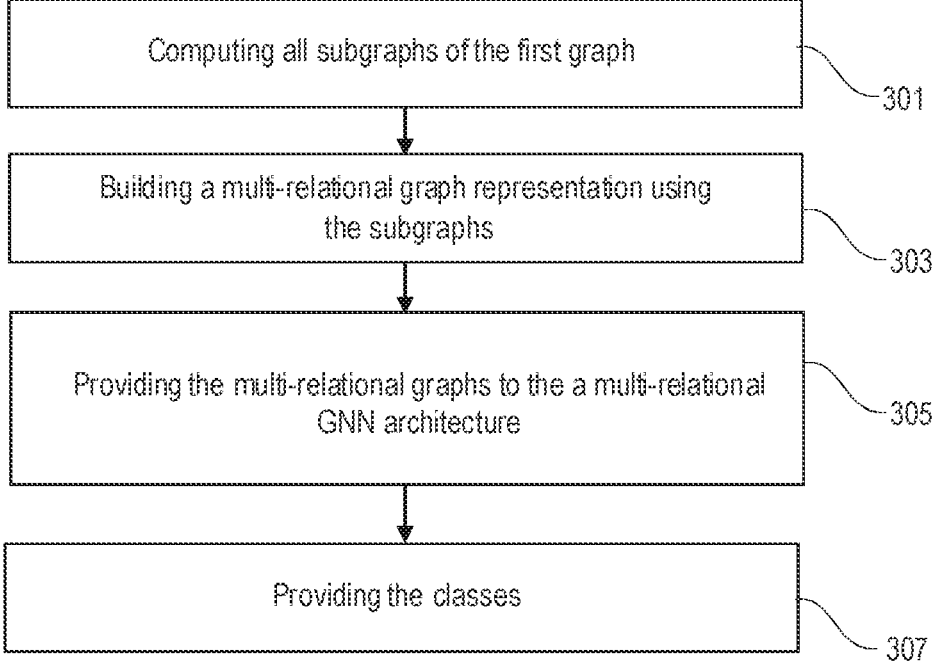
FIG. 3A is a flowchart of an approach for processing a graph in accordance with an example of the present subject matter.
Figure 3B:
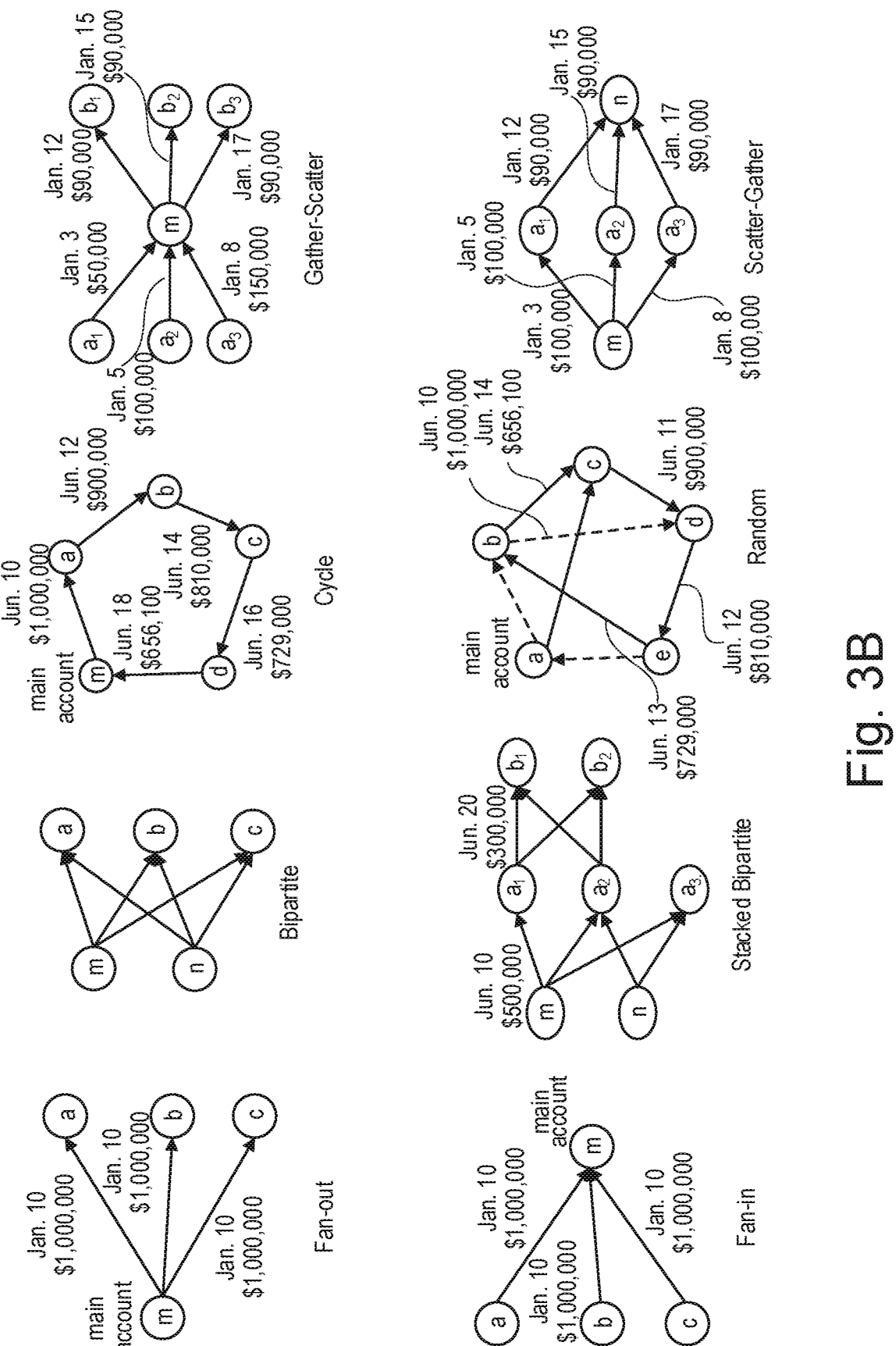
FIG. 3B depicts different subgraph patterns of a specific ontology.

FIG. 3A is a flowchart of an approach for processing a first graph in accordance with an example of the present subject matter. The first graph comprises nodes representing first entities and first edges representing relationships between the first entities. The first graph represents a finance ontology. In particular, the first entities are bank accounts and the first edges refer to transactions between accounts. FIG. 3B shows example patterns or subgraph patterns which are money-laundering patterns. Embodiments of the present method may use these patterns in order to classify suspicious and non-suspicious transactions in the first graph.

A processor may compute all the subgraphs of the first graph in step 301 and all the vertices and edges participating in them may be determined. The subgraphs may be identified using the patterns shown in FIG. 3B. The nodes in the subgraph patterns of FIG. 3B represent accounts and the edges represent transactions. Suspicious accounts are noted by "m". The number and timing of the transactions which are performed in each pattern may indicate that the pattern is a suspicious transaction pattern. For example, in the cycle pattern, the main account m sends large amount of money to one of the neighbor members a. The beneficiary account sends 90% of the received money to another neighbor. Finally, the last member d sends money to the main account m.

Figure 3C:
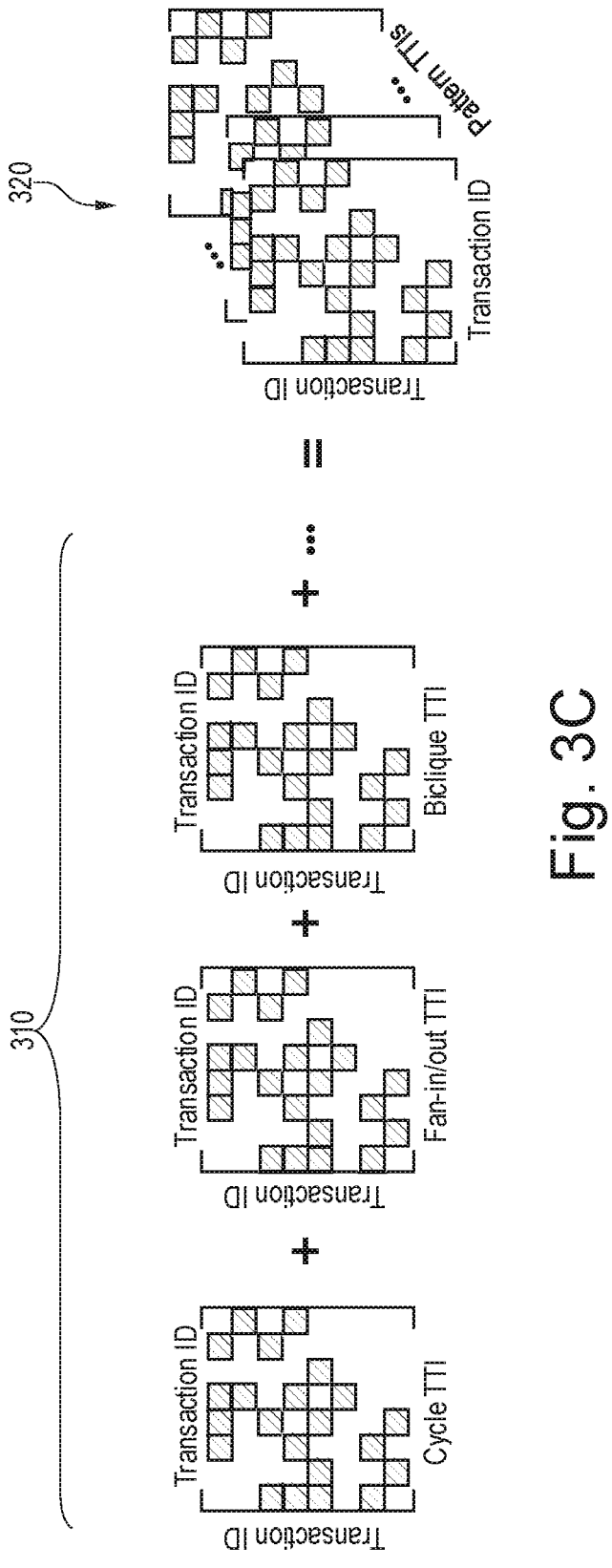
FIG. 3C is a diagram illustrating the creation of multi-relation graphs in accordance with an example of the present subject matter.

A processor may build a multi-relational graph representation in step 303 using the enumerated subgraphs. In multi-relational graphs, different types of edges may exist between vertices to indicate different types of relationships. For example, two vertices that participate in the same subgraph pattern are connected by a new edge to define a new relationship between them. For instance, if two vertices participate in the same cycle, we define a new relationship of type "cycle" between them. This step is performed for all types of patterns, e.g., cycles, cliques, and bicliques, for all subgraphs discovered belonging to each type and across all vertices in each subgraph discovered. This step may be performed as described with reference to FIG. 2A to create the matrices. These matrices 310 are shown for example in FIG. 3C. The matrices 310 have the same size which is defined by the number of edges (transactions) represented in the first graph. The matrices may represent the same nodes of the graph, but each matrix has its own values assigned to the nodes. The columns of each matrix represent the first edges (each first edge is assigned a transaction ID) respectively and the rows of each matrix represent the first edges respectively. The multi-relational graphs may be represented as a large 3D matrix 320 which is obtained by concatenating the individual matrices 310 associated with the different identified patterns, where the third dimension of the 3D matrix represents the different patterns shown in FIG. 3B.

A processor may provide the multi-relational graphs 310 in step 305 to the multi-relational GNN architecture to improve the accuracy of classification. A processor may provide the classes in step 307. For example, the model described herein may be used for inference of the RGNN in step 305 to obtain the embeddings $h_i$ at each layer $$l: h_i^{(l+1)} = \sigma\left(\sum_{r \in \mathcal{R}} \sum_{j \in N_i^r} \frac{1}{c_{i,r}} W_r^{(l)} h_j^{(l)} - W_0^{(l)} h_i^{(l)}\right).$$

In addition, a softmax activation may be applied per node on the output of the last layer. The output of the RGNN may indicate the class of each node in the multi-relational graphs.

Thus, embodiments of the present method may start from a uni-relational graph and transform it into multi-relational graphs based on the subgraph patterns discovered. This experiment on anti-money laundering datasets may demonstrate tangible accuracy improvements by using multi-relational graph representations.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 800 contains an example of an environment for the execution of at least some of the computer code involved in performing the inventive methods, such as a code 900 for graph processing based on subgraph patterns. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

Figure 4:
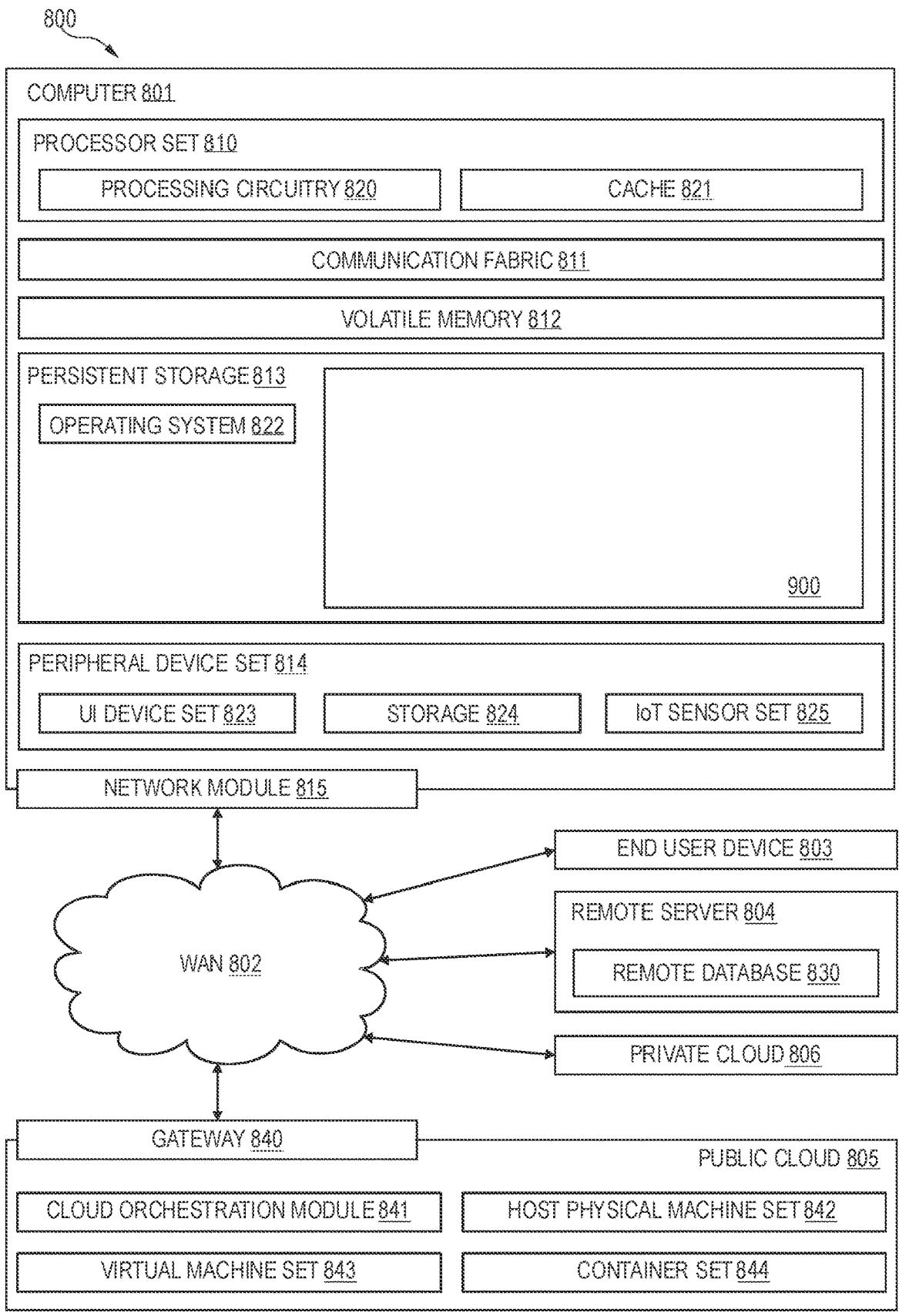
FIG. 4 is a computing environment in accordance with an example of the present subject matter.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 4. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:

training, using a full-batch gradient descent technique, a multi-relational graph neural network using training data comprising a set of multi-relational graphs with labeled nodes, wherein:

the multi-relational graph neural network is a relational graph convolutional network (RGCN), for generating embeddings for input entities and input edges of multi-relational graphs, that takes a set of vectors representing nodes as input, together with a structure of a graph, and generates a new collection of representations for nodes in the graph; and multiple layers of the multi-relational graph neural network are stacked such that output of a preceding layer is used as input for a current layer;

identifying subgraphs of predefined patterns in a first graph, the first graph: (i) representing a specific ontology and (ii) comprising nodes representing first entities and first edges representing relationships between the first entities, wherein:

the specific ontology comprises concepts of a specific domain; and each edge is connected to two nodes;

generating, by one or more processors, multi-relational graphs by representing the identified subgraphs by respective second graphs, each second graph comprising a matrix with nodes representing second entities and second edges representing relationships between the second entities, wherein:

for each respective matrix, each axis of the matrix corresponds to edges present within first graph cells set to a predefined value for each edge associated with the respective subgraph pattern;

the second entities are the respective nodes of the first graph;

each second edge indicates that the two second entities linked by the second edge are part of a pattern of the predefined patterns; and the multi-relational graphs are represented as a three-dimensional matrix obtained by concatenating each individual matrix;

inputting the multi-relational graphs to the multi-relational graph neural network for generating output in accordance with the specific ontology; and providing the output of the multi-relational graph neural network, the output including an indication of a class of the ontology for each node in the multi-relational graphs.

2. The computer-implemented method of claim 1, further comprising prior to inputting the multi-relational graphs to the multi-relational graph neural network, adding an additional graph to the multi-relational graphs.

3. The computer-implemented method of claim 1, wherein representing the identified subgraphs by the respective second graphs further comprises adding a node to the respective second graph that represents the pattern associated with a subgraph of the identified subgraphs and linking the second entities that belong to the pattern with a created entity.

4. The computer-implemented method of claim 1, wherein responsive to the second entities being the first entities of the first graph, the second edges comprise first edges of the first graph.

5. The computer-implemented method of claim 1, further comprising:

creating a table having a record per second entity of the second graph, the table comprising fields representing a predicted embedding and one or more attributes descriptive of the second entities; and providing records of the table as input to a Light Gradient Boosting Model for classification of the second entities into classes of the specific ontology.

6. The computer-implemented method of claim 1, wherein the predefined patterns are defined according to rules of the specific ontology.

7. The computer-implemented method of claim 1, wherein the predefined patterns are selected from the group consisting of: fan-out pattern, bipartite pattern, cycle pattern, gather-scatter pattern, fan-in pattern, stacked bipartite pattern, and scatter-gather pattern.

8. The computer-implemented method of claim 1, further comprising creating a table having a record per second entity of the second graph, the table comprising fields representing a predicted embedding and one or more attributes descriptive of the second entities and storing the table.

9. The computer-implemented method of claim 1, wherein:

for each pattern, multiple subgraphs are identified in the first graph; and for each pattern, the second graph represents the multiple subgraphs representing the pattern.

10. The computer-implemented method of claim 2, wherein, responsive to the second entities of the second graph representing the first entities, the additional graph is the first graph.

11. The computer-implemented method of claim 2, wherein, responsive to the second entities of the second graph representing the first edges, the additional graph is a line graph representing the first graph.

12. The computer-implemented method of claim 1, further comprising:

minimizing cross-entropy loss on labeled nodes.

13. The computer-implemented method of claim 1, wherein:

the specific ontology comprises a biology ontology; and the relationships between the first entities for each of the first edges comprise associative relationships.

14. A computer program product comprising:

one or more computer readable storage media; and program instructions stored on the one or more computer readable storage media to perform operations comprising:

training, using a full-batch gradient descent technique, a multi-relational graph neural network using training data comprising a set of multi-relational graphs with labeled nodes, wherein:

the multi-relational graph neural network is a relational graph convolutional network (RGCN), for generating embeddings for input entities and input edges of multi-relational graphs, that takes a set of vectors representing nodes as input, together with a structure of a graph, and generates a new collection of representations for nodes in the graph; and multiple layers of the multi-relational graph neural network are stacked such that output of a preceding layer is used as input for a current layer;

identifying subgraphs of predefined patterns in a first graph, the first graph: (i) representing a specific ontology and (ii) comprising nodes representing first entities and first edges representing relationships between the first entities, wherein:

the specific ontology comprises concepts of a specific domain; and each edge is connected to two nodes;

generating multi-relational graphs by representing the identified subgraphs by respective second graphs, each second graph comprising a matrix with nodes representing second entities and second edges representing relationships between the second entities, wherein:

for each respective matrix, each axis of the matrix corresponds to edges present within first graph cells set to a predefined value for each edge associated with the respective subgraph pattern;

the second entities are the respective nodes of the first graph;

each second edge indicates that the two second entities linked by the second edge are part of a pattern of the predefined patterns; and the multi-relational graphs are represented as a three-dimensional matrix obtained by concatenating each individual matrix;

inputting the multi-relational graphs to the multi-relational graph neural network for generating output in accordance with the specific ontology; and providing the output of the multi-relational graph neural network, the output including an indication of a class of the specific ontology for each node in the multi-relational graphs.

15. The computer program product of claim 14, wherein the operations further comprise:

prior to inputting the multi-relational graphs to the multi-relational graph neural network, adding an additional graph to the multi-relational graphs.

16. The computer program product of claim 14, wherein representing the identified subgraphs by the respective second graphs further comprises adding a node to the respective second graph that represents the pattern associated with a subgraph of the identified subgraphs and linking the second entities that belong to the pattern with a created entity.

17. The computer program product of claim 14, wherein responsive to the second entities being the first entities of the first graph, the second edges comprise first edges of the first graph.

18. The computer program product of claim 14, wherein the operations further comprise:

creating a table having a record per second entity of the second graph, the table comprising fields representing a predicted embedding and one or more attributes descriptive of the second entities; and providing records of the table as input to a Light Gradient Boosting Model for classification of the second entities into classes of the specific ontology.

19. The computer program product of claim 14, wherein the predefined patterns are defined according to rules of the specific ontology.

20. A computer system comprising:

a processor set;

one or more computer readable storage media; and program instructions stored on the one or more computer readable storage media to cause the processor set to perform operations comprising:

training, using a full-batch gradient descent technique, a multi-relational graph neural network using training data comprising a set of multi-relational graphs with labeled nodes, wherein:

the multi-relational graph neural network is a relational graph convolutional network (RGCN), for generating embeddings for input entities and input edges of multi-relational graphs, that takes a set of vectors representing nodes as input, together with a structure of a graph, and generates a new collection of representations for nodes in the graph; and multiple layers of the multi-relational graph neural network are stacked such that output of a preceding layer is used as input for a current layer;

identifying subgraphs of predefined patterns in a first graph, the first graph: (i) representing a specific ontology and (ii) comprising nodes representing first entities and first edges representing relationships between the first entities, wherein:

the specific ontology comprises concepts of a specific domain; and each edge is connected to two nodes;

generating multi-relational graphs by representing the identified subgraphs by respective second graphs, each second graph comprising a matrix with nodes representing second entities and second edges representing relationships between the second entities, wherein:

for each respective matrix, each axis of the matrix corresponds to edges present within first graph cells set to a predefined value for each edge associated with the respective subgraph pattern;

the second entities are the respective nodes of the first graph;

each second edge indicates that the two second entities linked by the second edge are part of a pattern of the predefined patterns; and the multi-relational graphs are represented as a three-dimensional matrix obtained by concatenating each individual matrix;

inputting the multi-relational graphs to the multi-relational graph neural network for generating output in accordance with the specific ontology; and providing the output of the multi-relational graph neural network, the output including an indication of a class of the specific ontology for each node in the multi-relational graphs.

* * * * *